United States Patent
Rehfuss et al.

[11] Patent Number: 5,371,167
[45] Date of Patent: Dec. 6, 1994

[54] CARBOXYL-FUNCTIONAL COMPOUND FOR CURABLE COATING COMPOSITION

[75] Inventors: John W. Rehfuss, West Bloomfield; Walter H. Ohrbom, Southfield, both of Mich.

[73] Assignee: BASF Corporation, Southfield, Mich.

[21] Appl. No.: 968,549

[22] Filed: Oct. 29, 1992

Related U.S. Application Data

[63] Continuation-in-part of Ser. No. 826,353, Jan. 27, 1992, abandoned.

[51] Int. Cl.$^5$ ............................................. C08G 18/34
[52] U.S. Cl. ........................................ 528/73; 528/49;
528/84; 528/272; 528/296; 528/363; 528/365;
528/289; 528/292; 544/221; 544/222; 525/127;
525/128; 525/167; 525/186; 525/417; 525/440;
525/454; 525/457; 525/453; 525/528; 525/519;
252/182.28
[58] Field of Search .................... 544/221, 222, 49;
528/272, 296, 363, 365, 289, 292; 525/127, 128,
167, 186, 417, 453, 519; 252/182.28

[56] References Cited

U.S. PATENT DOCUMENTS

| | | | |
|---|---|---|---|
| 3,971,745 | 6/1976 | Carlson et al. | 525/440 |
| 4,301,053 | 11/1981 | Wolfrey | 524/906 |
| 4,727,111 | 2/1988 | Pettit | 525/190 |
| 4,788,255 | 11/1988 | Pettit | 525/176 |
| 4,937,288 | 9/1989 | Pettit | 525/176 |
| 4,942,215 | 7/1990 | Greco et al. | 528/114 |
| 5,039,732 | 8/1991 | Arora | 528/71 |
| 5,066,705 | 11/1991 | Wickert | 524/460 |
| 5,104,928 | 4/1992 | Craun | 524/773 |
| 5,182,337 | 1/1993 | Pettit | 525/175 |
| 5,214,101 | 5/1993 | Pettit | 525/176 |

OTHER PUBLICATIONS

Encyclopedia of Polymer Science and Engineering; vol. 13, 1988; John Wiley & Sons, pp. 288–289.

*Primary Examiner*—John Kight, III
*Assistant Examiner*—R. Johnson
*Attorney, Agent, or Firm*—Paul L. Marshall

[57] ABSTRACT

A coating composition is described comprising two components that are reactable with each other to cure the coating. The two components are:
(a) a carboxyl-functional polyurethane component that is the reaction product of:
  (i) a polyisocyanate compound, and
  (ii) a compound comprising at least one acid group and at least one isocyanate-reactive group,
(b) a component comprising at least two groups that are reactive with the epoxy groups on the polyurethane compound.

14 Claims, No Drawings

CARBOXYL-FUNCTIONAL COMPOUND FOR CURABLE COATING COMPOSITION

This is a continuation-in-part of U.S. patent application Ser. No. 07/826,353, filed Jan. 27, 1992, now abandoned.

FIELD OF THE INVENTION

This invention is related to coatings and to curable compositions for producing coatings. In particular, the invention is related to coatings useful for automotive coatings, especially automotive clearcoats.

BACKGROUND OF THE INVENTION

Polymeric coatings are widely used in a variety of applications for both protective and decorative purposes. The requirements of maintaining good appearance even after exposure to weathering and other forms of attack are particularly stringent in the field of automotive coatings. Other properties that are desirable for coatings, such as automotive coatings, include good tensile strength, scratch and mar resistance, flexibility, and adhesion to a variety substrates and coatings.

Many polymer coating compositions are curable coating compositions. By this it is meant that an additional reaction, such as a crosslinking reaction, takes place after the coating is applied to a substrate. In order to provide coatings having an optimum combination of the above-described properties, many curable coating compositions in recent years have utilized the so-called carboxy-epoxy cure mechanism. This type of curing depends on a reaction between a compound having epoxy-functional group(s) and a curing agent having carboxy-functional group(s). By way of a ring-opening reaction between the carboxy groups and the epoxy groups, a matrix of chemical bonds is formed, resulting in a hard cured coating.

One such carboxy-epoxy-cure coating composition is described in U.S. Pat. No. 4,699,814. This patent describes a coating composition comprising (a) an epoxy-functional polyurethane resin that is prepared by reacting an isocyanate with a hydroxyl-functional polyepoxide having two or more epoxy groups per molecule, and (b) a polyacid, anhydride, or polyamine curing agent.

Many coating compositions that are cured via a carboxy-epoxy cure mechanism exhibit film properties that are less than desirable. For example, some compositions may result in films that do not exhibit sufficiently high strength or hardness. Other compositions may result in films that are not sufficiently flexible. Still other compositions may result in films that are brittle. Other problems, such as wrinkling, or poor adhesion (which can result in delamination) may also be experienced.

It is thus an object of this invention to provide a coating composition that utilizes the carboxy-epoxy cure mechanism, and that is capable of producing a cured film coating having the desirable film properties described above.

SUMMARY OF THE INVENTION

According to the present invention, there is provided a coating composition comprising a carboxyl-functional compound and a compound comprising at least two groups that are reactive with the carboxyl group. The carboxy-functional compound is prepared by reacting a polyisocyanate compound with a compound comprising at least one acid group and at least one isocyanate-reactive group.

DESCRIPTION OF THE PREFERRED EMBODIMENTS

The carboxy-functional compound used in the composition of the invention is typically the reaction product of a polyisocyanate compound and a compound comprising at least one acid group and at least one isocyanate-reactive group. The polyisocyanate has at least two isocyanate groups, and preferably no more than six. Illustrative examples of useful polyisocyanates include monomeric polyisocyanates, such as isophorone diisocyanate, trimethylhexamethylene diisocyanate, dicyclohexylmethane diisocyanate, and toluene diisocyanate; isocyanurates and biurets of monomeric isocyanates, such as the isocyanurate of isophorone diisocyanate, the isocyanurate of hexamethylene diisocyanate, or the biuret of hexamethylene diisocyanate; and oligomers or prepolymers of isocyanates. Oligomers or prepolymers of isocyanates may be formed by the reaction of an excess of polyisocyanate equivalents with a compound containing more than one isocyanate-reactive group. Examples of useful compounds containing more than one isocyanate-reactive group include polyols, including alkyl polyols, polyester polyols, polyether polyols, and acrylic polyols; and polyamines.

The polyisocyanate compound is reacted with a compound comprising at least one acid group and at least one isocyanate-reactive group. If the polyisocyanate compound is a diisocyanate, then the acid-containing compound may comprise more than one isocyanate-reactive group. If the polyisocyanate has more than two isocyanate groups per molecule, then the acid-containing compound preferably contains only one isocyanate-reactive group. The isocyanate-reactive group is preferably an alcohol or an amine. Illustrative examples of the hydroxyl-functional compounds comprising a single acid group are monomers such as glycolic acid, 12-hydroxy stearic acid, lactic acid, 3-hydroxybutyric acid, 4-hydroxybutyric acid, 10-hydroxydecanoic acid, 2,2-dimethyl-3-hydroxypropionic acid, dimethylolpropionic acid, 1-hydroxy-1-cyclopropane-carboxylic acid, 4-hydroxybenzoic acid, 2-hydroxyphenylacetic acid, 3-hydroxyphenylacetic acid, salicylic acid, 2,4-dihydroxybenzoic acid, 2,5-dihydroxybenzoic acid, and 3,5-dihydroxy-2-naphthoic acid.

Yet other hydroxy-functional acid resins can be prepared by modifying a polyol to produce a compound containing an acid group. For example, a polyol can be reacted with an anhydride to generate an ester while retaining a residual hydroxy group on the acid-functionalized molecule. Alternatively, a monoepoxide may be reacted with a excess equivalents of polyacid to generate hydroxyl groups on the same molecule with residual acid functionality. Prepolymers or oligomers of such monomers may also be used. For example, monomers comprising at least one acid group may be made using oligomeric polyols where the polyol has been reacted with $\epsilon$-caprolactone to form a caprolactone oligomer. Polymeric compounds such as acrylics, polyurethanes, or polyesters may contain both hydroxy and acid functionality.

The polyisocyanate compound and the hydroxyl-functional compound comprising at least one acid group may be reacted together in an organic medium. Preferred solvents for the reaction are ketones, aromatics, ethers, amides, and other solvents inert to the reaction in which the reactants can be solubilized.

Although it is not required, it may be preferable to carry out the reaction with the use of a catalyst, depending on the reaction conditions. The reaction temperature may be between 0° C. and 100° C., but the reaction can usually be carried out between room temperature and 75° C. The catalyst, if used, may be chosen from a great number known in the art to promote the isocyanate-hydroxyl reaction. By way of example, tin compounds such as dibutyltin oxide and dibutyltin dilaurate are commonly used.

The ratio of equivalents of polyisocyanate to equivalents of the hydroxyl-functional acid compound are 0.9:1 to 1.1:1, and preferably the ratio is 1:1. In the case where there are excess equivalents of isocyanate, the excess isocyanate after the completion of the reaction of the polyisocyanate with the hydroxyl-functional acid compound may, for example, be quenched by reaction with a monoalcohol.

Illustrative examples of amine-functional compounds comprising at least one acid group are monomers such as glycine, β-alanine, N-(2-hydroxylethyl)ethylenediaminetriacetic acid, glycylglycine, or α-aminocaproic acid. Amine-functional compounds comprising at least one acid group may be formed by the reaction of hydroxyl and primary or secondary amine functional compounds with cyclic anhydrides (e.g., a 1,2-acid anhydride such as hexahydrophthalic anhydride and alkylhexahydrophthalic anhydride). The hydroxyl and primary amine functional compounds are, for example, hydroxylamine, ethanolamine, 1-amino-2-propanol, 2-amino-1-propanol, 4-amino-1-butanol, and 6-amino-1-hexanol. Examples of suitable anhydrides are monomeric anhydrides such as alkyl hexahydrophthalic anhydride wherein the alkyl group has up to 7 carbon atoms, e.g., methylhexahydro-phthalic anhydride, succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, tetrachlorophthalic anhydride, endomethylene tetrahydrophthalic anhydride, chlorendic anhydride, itaconic anhydride, citraconic anhydride, and maleic anhydride. The anhydride may also be polymeric, such as copolymers of maleic anhydride with other ethylenically unsaturated monomers prepared using procedures well-known in the art such as free-radical or anionic polymerization.

Acrylic copolymers that contain both amino and acid functionality may be formed.

The polyisocyanate compound and the amino-functional compound comprising at least one acid group may be reacted together in an organic medium. Preferred solvents for the reaction are ketches, esters, and other solvents inert to the reaction in which the reactants can be solubilized. The reaction may also be carried out by adding the isocyanate to an aqueous solution of the salt of an amino acid, with acidification of the product to generate the acid functional polyisocyanate compound.

The reaction may be carried out under mild conditions. The reaction temperature may be between 100° C. and 80° C., but the reaction can usually be carried out between room temperature and 50° C.

The ratio of equivalents of polyisocyanate to equivalents of the amino-functional acid compound are 1:1.05 to 1.1:1, and preferably the ratio is 1:1. In the case where there are excess equivalents of isocyanate, the excess isocyanate after the completion of the reaction of the polyisocyanate with the amino-functional acid compound may, for example, be quenched by reaction with a monoalcohol or monoamine.

The acid-functional compound may have the general formula (I):

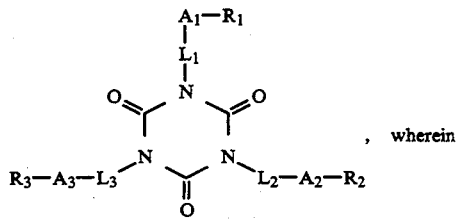

, wherein $L_1$, $L_2$, and $L_3$ each independently represents a divalent linking group, $A_1$, $A_2$, and $A_3$ each independently represents a urethane linkage or a urea linkage, and $R_1$, $R_2$, and $R_3$ each independently represents a substituent comprising a carboxyl group.

The acid-functional isocyanurate compounds of formula (I) comprise a cyanuric ring and three monoepoxide substituents that are each independently linked to the cyanuric ring through urethane or urea linkages, as shown in formula (I). Examples of the divalent linking groups $L_1$, $L_2$, and $L_3$ include hexamethylene and the residue of an isophorone group. Examples of $R_1$, $R_2$, and $R_3$ include alkyl carboxyl, cycloaliphatic carboxyl, and aromatic carboxyl.

Different synthetic schemes may be used to produce the compounds according to formula (I). For example, a diisocyanate may be first reacted with an acid-functional compound containing an isocyanate-reactive group, followed by formation of an isocyanurate. Alternatively, an isocyanurate or cyanuric ring having multiple functional groups other than isocyanate groups may be adducted with substituents that have the capability of forming acid groups after the reaction with the isocyanate groups is completed. A particularly desirable method of synthesis, due to its relative ease and lack of undesirable by-products, is to react an isocyanurate or cyanuric ring having multiple functional groups other than isocyanate groups with a compound comprising at least one acid group and at least one group reactive with the cyanuric ring compound.

The composition of the divalent linking group may be controlled by the type of cyanuric ring compound or polyisocyanate chosen. The divalent linking groups individually may be either an aliphatic or aromatic group, preferably of 1 to 12 carbon atoms with terminal urea or ester bonding to the substituent comprising at least one acid group. If resistance to solar degradation is desirable, then the divalent linking groups are preferably all aliphatic.

An isocyanurate may be formed by techniques known in the art, such as through the condensation of one or more types of diisocyanates, such as hexamethylene diisocyanate, or isophorone diisocyanate. Examples of preferred isocyanurates include the isocyanurate of hexamethylene diisocyanate, and the isocyanurate of isophorone diisocyanate. If light-fastness is not a critical requirement, then an aromatic isocyanurate such as the isocyanurate of 2,4-toluene diisocyanate may be used.

The isocyanurate may be reacted with a compound containing at least one acid group, examples of which have previously been given, or with a compound that is capable of forming an acid group. As an example of the latter, an amino alcohol can be reacted with the isocyanate with the amino group selectively reacting. The alcohol group may then be adducted with an anhydride to form the acid-functional ester.

The acid-functional compound, whether the reaction product of a polyisocyanate compound and an isocyanate-reactive compound comprising at least one acid group or an acid-functional cyanuric ring compound according to the formula hereinabove, has a molecular weight of 242 to 8000, preferably 800 to 2000. The acid number is 5 to 400, preferably 90 to 250.

The coating composition further comprises a second component comprising at least two groups that are reactive with the acid group on the acid-functional compound. This second component may be a monomer, oligomer, or polymer, including polyols, polyepoxides, carbodiimides, melamine-formaldehyde resins, and urea-formaldehyde resins. Polyepoxides and carbodiimides are preferred.

Among the polyepoxides that can be used are epoxy-containing acrylics, epoxy condensation polymers such as polyglycidyl ethers of alcohols and phenols, epoxy-functional polyurethanes, and certain polyepoxide monomers and oligomers.

In one preferred embodiment, the second component is an epoxy-functional acrylic polymer or oligomer. Illustrative examples of epoxy-functional acrylics are copolymers of an ethylenically unsaturated monomer containing an epoxy group. The copolymers may be prepared by using conventional techniques such as free radical polymerization or anionic polymerization in, for example, a batch or semi-batch process. For instance, the polymerization may be carried out by heating the ethylenically unsaturated monomers in bulk or in organic solution in the presence of a free radical source such as an organic peroxide or azo compound and, optionally, a chain transfer agent for a batch process; or, alternatively, the monomers and initiator(s) may be fed into the heated reactor at a controlled rate in a semi-batch process.

Examples of the ethylenically unsaturated monomers containing an epoxy group can be glycidyl acrylate, glycidyl methacrylate, and allyl glycidyl ether. Other copolymerizable monomers can be alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, cyclohexyl monoepoxy methacrylate, and the like; vinyl monomers such as styrene, vinyl toluene and the like. In one preferred embodiment, the copolymerizable monomers comprise sterically hindered monomers so that the epoxy-functional acrylic conforms to the requirements of environmental etch-resistant acrylics disclosed in application Ser. No. 07/699,297, pending 4400 that is incorporated herein by reference. Copolymerizable monomers containing groups which will react with the epoxy groups under the addition reaction conditions chosen are to be avoided so as to produce an ungelled product.

Polyepoxides useful as component (b), such as polyglycidyl methacrylates, preferably have weight per epoxides of 200 to 10,000, more preferably from 300 to 1000. The polyepoxides typically have a weight average molecular weight in the range of 130 to 40,000, and preferably 130 to 6000. The weight average molecular weight is usually determined experimentally by gel permeation chromatography using a polystyrene standard. It is therefore not an actual molecular weight, but rather, it indicates that the molecules occupy the same amount of space that a styrene molecule of a known molecular weight would occupy.

Examples of epoxy-functional polyurethanes include those described in U.S. patent application Ser. No. 07/968,550, now abandoned, entitled, "Epoxy-Functional Polyurethane and Curable Coating Composition", filed on even date herewith in the names of J. Rehfus and W. Orbohm.

The epoxy condensation polymers that are used as polyepoxides, that is, those having a 1,2-epoxy equivalency greater than 1, preferably greater than 1 and up to about 3.0. Examples of such epoxides are polyglycidyl ethers of polyhydric phenols and aliphatic alcohols. These polyepoxides can be produced by etherification of the polyhydric phenol or aliphatic alcohol with an epihalohydrin such as epichlorohydrin in the presence of alkali.

Carbodiimides are well-known in the art. Examples of useful carbodiimides include XL-20 and XL-24, both available from Union Carbide.

Examples of suitable polyphenols are 2,2-bis(4-hydroxyphenyl)propane (bisphenol A), 1,1-bis(4-hydroxyphenyl)ethane, and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)-cyclohexane and hydrogenated bisphenol A can be used.

Besides the epoxy-containing polymers described above, certain polyepoxide monomers and oligomers can also be used. Examples of those materials are described in U.S. Pat. No. 4,102,942 in column 3, lines 1–16. Specific examples of such low molecular weight polyepoxides are 3,4-epoxycyclohexylmethyl-3,4-epoxycyclohexanecarboxylate and bis(3,4-epoxycyclohexylmethyl)adipate. Melamine-based polyepoxide compounds available from Monsanto Co., St. Louis, Mo., as LSE's are also examples of these materials and are preferred.

Polyols useful in the present formulations contain at least two and preferably more than two hydroxyl groups per molecule.

Melamine-formaldehyde resins and urea-formaldehyde resins may be partially or fully etherified with monoalcohols of from 1 to 8 carbons, preferably 1 to 4 carbons. Such compounds are effective as crosslinkers in either monomeric or polymeric forms.

The acid-functional compound and the second compound may be combined in the coating composition in ratios of from 1 equivalent of acid to 2 equivalents of second compound, to 1 equivalent of acid to 0.8 equivalents of second compound. Most preferably the ratio is one equivalent acid to one equivalent second compound.

In addition to the acid-functional compound and the acid-reactive compound, the coating composition may contain other constituents known to be used in coatings, such as catalysts, rheology control agents, light stabilizers, antioxidants, pigments, solvents, plasticizers, reactive diluents, and the like.

A catalyst may advantageously be employed to promote the development of film properties, particularly when the curing conditions are less than optimum. For the acid-epoxy reaction, a wide variety of materials are known to be useful, including metal acetoacetates such as aluminum monobutyl acetoacetate, aluminum dibutyl acetoacetate, and aluminum tributyl acetoacetate; Lewis acids, such as triphenyl phosphine, and boron trifluoride; amines, such as dimethylbenzylamine, dimethyldodecylamine, and 1,4-diazabicyclo[2.2.2.]octane (Dabco); quaternary ammonium or phosphonium salts, such as tetramethyl ammonium chloride, tetraethyl ammonium chloride, tetrabutylphosphonium chloride, or tetramethyl ammonium bromide; metal oxides such as calcium oxide; and amino acids, such as glycine or b-alanine. A more complete list of catalysts that may be utilized is found in *Kinetics and Mechanisms of Polyesterifications. II. Reactions of Diacids with Diepoxides*, Pierre-Jean Madec and Ernest Maréchal Advances In Polymer Science, Volume 71 (Springer-Verlag, 1985). The particular catalyst utilized may depend on the individual system, but in general tertiary amines are preferred. The acid-alcohol reaction may be catalyzed with catalysts such as t-amines, quaternary amines, and metal complexes. Reactions with polymeric melamines are usually not catalyzed, but monomeric melamines, particularly fully alkylated monomeric melamines, may advantageously be catalyzed with sulfonic acids (e.g., p-toluene sulfonic acid), phenyl acid phosphate, or Lewis acids. The most favorable level for the catalyst is often best determined experimentally; however, in general that level will be from 0.1 to 5%, based on the total weight of solid reactants.

The coating composition includes the solvents used in the synthesis of the reactive components, and, preferably, additional solvent that may be added during formulation of the coating composition in order to enhance its application characteristics. The inclusion of solvent aids in the flow and leveling of the applied coating. Moreover, if the coating is applied by means of spraying the solvent can be added to improve the atomization of the coating composition.

The preferred solvents are organic solvents free of acid, alcohol, or amino functionality. Although usually avoided because of their possible involvement in reactions, some water or low molecular weight species of those types just mentioned may be included in some instances without seriously affecting the final film properties. Moreover, in some cases higher molecular weight species may purposely be included to function as plasticizers or reactive diluents.

Examples of useful solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone.

Pigments, if used, can be incorporated as pastes prepared by using grinding resins or pigment dispersants according to methods well known in the art. The term "pigments" is meant to encompass organic and inorganic compounds that are colored materials, fillers, metallic and flake materials, and other materials known in the art. If pigments are included, they are usually used in an amount of 10% to 200% based on the total solid weight of the reactants.

If the coating composition is to be used to make a topcoat, such as an automotive clearcoat, or other coating that will be subject to outdoor exposure, it may be desirable to include one or more compounds to forestall degradation by UV light. Many varieties of compounds are utilized in this regard, and specifically there may be mentioned UV light absorbers like benzotriazoles, benzotriazines, and oxalamides; light stabilizers such as hindered amines or hindered amides; and antioxidants such as metal compounds (e.g., nickel complexes of alkylated phenol phosphonates) or hindered phenols such as 4-methyl-2,6-di-t-butylphenol.

It is permissible and often desirable to include small amount of theology control agents, for example, fumed silicas or cellulosics like cellulose acetate butyrate. Such materials are usually used at levels of less than 10% based on the total solid weight of reactants. Other materials used for surface modification, like polydimethylsiloxanes or polybutyl acrylate, are typically used in much lower amounts, usually not exceeding 1 or 2% based on the total solid weight of reactants.

The composition may be stored as a one pack, with all the materials in one container; but it is often preferable to be stored as a two-pack composition, where the reactants are segregated to prevent reaction prior to application and thereby to improve shelf-life substantially. In the case of a two-pack composition, the two parts are mixed together at some time prior to application to a substrate.

The prepared coating composition may be applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 60 syphon spray gun (available from Binks Manufacturing Corp., Franklin Park, Ill.) with 50–80 psi atomizing air pressure.

The substrate to which the coating composition of this invention is to applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited to use over primed automotive substrates as pigmented basecoat formulations or over basecoated automotive substrates as clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°–150° C. for 30 minutes. The thickness of the cured coating can be from 2.5 to 125 μm, but when used as an automotive topcoat or clearcoat the coating thickness is generally about 50 μm.

In a preferred embodiment of the invention, the coating composition of the present invention is used as a clearcoat and is applied wet-on-wet over a basecoated substrate. By the term "wet-on-wet", it is meant that after application the basecoat is allowed to flash, or dry, to remove most of the solvent, but it is not cured before the clearcoat composition is applied. After the clearcoat composition is applied, it is allowed to flash or dry for a period of time. Then the base coat and the clearcoat are cured together.

The basecoat may be a coating composition according to this invention or another composition known in the art. The basecoat does not necessarily have the cure mechanism used by the clearcoat, although the cure of the base coat should not interfere with the curing of the clearcoat. For example, the basecoat might utilize a melamine-polyol reaction to cure, where the polyol may be for instance an acrylic, a polyurethane, or a polyester. Typical basecoat formulations and their methods of use are described in U.S. Pat. Nos. 4,791,168, 4,414,357, and 4,546,046, the disclosures of which are incorporated herein by reference.

After application and flashing of the basecoat, the clearcoat composition is applied, preferably by spraying. The clearcoat may be applied in one coat, or preferably two coats with a short flash between coats. The clearcoat composition is allowed to flash under ambient or heated conditions for 1–20 minutes. The uncured coatings are then cured, usually by thermoset methods as described hereinabove. The resulting appearance and physical properties are excellent.

The following examples are provided to further illustrate the invention.

EXAMPLE 1

Preparation of Acid-Functional Polyisocyanate

A reactor was charged with 121.7 g of anhydrous methyl isobutyl ketone, 12.2 g of xylene. 241.0 G (0.636 equivalents (experimental)) of T1890 (the isocyanurate of isophorone diisocyanate, available from Hüls America, Inc., Piscataway, N.J.), and 0.2 gram of dibutyl tin dilaurate under an atmosphere of nitrogen. A slow nitrogen purge was continuously provided to the reactor during the synthesis. The mixture in the reactor was heated with stirring to 40° C. 191.1 g of 12-hydroxystearic acid were added over about 2 hours. The heat was steadily increased to 75° C. during the first hour and maintained at about 75° C. until all of the 12-hydroxystearic acid had been added. Analysis of the reaction solution by IR spectroscopy 40 minutes later showed only trace amount of isocyanate remained. This residual isocyanate was quenched with 10 g of normal butanol. The product had a solids content of 63.3% and a Gardener-Holt viscosity of U−V. The measured weight per acid group was measured at 619.9 g solids per equivalent acid.

EXAMPLE 2

Preparation of Acid-functional Compound With Cyanuric Ring

A reactor was charged with 438.5 g of 1,3,5-tris(2-hydroxyethyl)cyanuric acid, 440.4 g of methyl amyl ketone, and 840.0 g of methylhexahydrophthalic anhydride under an atmosphere of nitrogen. A slow nitrogen purge was continuously provided to the reactor during the synthesis. The mixture in the reactor was heated with stirring to about 150° C. At 123° C. it was noted that most of the 1,3,5-tris(2-hydroxyethyl)cyanuric acid had dissolved. After holding for an hour at about 150° C., the mixture was cooled to 134° C. and 248.4 g of normal butanol was added. The product had a solids (non-volatile) content of 68.1% and a viscosity of 27.8 dPa-s. The measured acid number was 224.8 mg KOH per gram non-volatile.

EXAMPLE 3

Preparation of Epoxy-Functional Polyisocyanate

A reactor equipped with an add funnel was charged with 401.5 g of dry methyl isobutyl ketone. 507.3 G (1.4 equivalents (experimental)) of T1890 (the isocyanurate of isophorone diisocyanate, available from Hüls America, Inc., Piscataway, N.J.), and 0.3 gram of dibutyl tin dilaurate under an atmosphere of nitrogen. A slow nitrogen purge was continuously provided to the reactor during the synthesis. The mixture in the reactor was heated with stirring to 47° C. During the heat up period 103.8 g of glycidol were charged to the add funnel. Care was taken to prevent the glycidol from coming into contact with any water during the charging process or while in the add funnel. When the mixture reached 47° C., the glycidol add was commenced and continued for about 50 minutes. The rate was sufficiently slow so that the heat was maintained at or below 50° C. After the glycidol add was completed, 23 g of anhydrous methyl isobutyl ketone were used to rinse the add funnel and were added to the reactor. Titration of the isocyanate content an hour and a half later showed that the reaction was 91% completed. At that point the reaction mixture was heated from 34° C. to about 40° C. and held there for another hour and a half. The reaction was continued with no further heat until a residual amount of less than 0.005% of the isocyanate remained unreacted. This residual isocyanate was quenched with 5 g of dry methanol. A GC of the reaction mixture showed no residual glycidol. The product had a solids content of 48.2% and a Gardener-Holt viscosity of A−. The theoretical weight per epoxy was 348.2 g per equivalent on solids.

EXAMPLE 4

Preparation of Epoxy-Functional Polyisocyanate

A reactor equipped with an add funnel was charged with 283.8 g of dry methyl isobutyl ketone, 470.7 g (2.36 equivalents (experimental)) of N3300 (the isocyanurate of hexamethylene diisocyanate, available from Mobay Corporation, Pittsburgh, Pa.), and 0.7 gram of dibutyl tin dilaurate under an atmosphere of nitrogen. A slow nitrogen purge was continuously provided to the reactor during the synthesis. The mixture in the reactor was heated with stirring to 47° C. During the heat up period 174.7103.8 g of glycidol were charged to the add funnel. Care was taken to prevent the glycidol from coming into contact with any water during the charging process or while in the add funnel. When the mixture reached 47° C., the glycidol add was commenced and continued for an hour and 20 minutes. The rate was sufficiently slow so that the heat was; maintained at or below 54° C. After the glycidol add was completed, 58.7 g of methyl isobutyl ketone were used to rinse the add funnel and were added to the reactor. Titration of the isocyanate content after about half an hour showed that the reaction was complete. A GC of the reaction mixture showed no residual glycidol. The product had a solids content of 67.5% and a Gardener-Holt viscosity of G−H. The theoretical weight per epoxy was 291.7 g per equivalent on solids.

EXAMPLE 5

Preparation of Epoxy-Functional Acrylic

A reactor was charged with 900.8 g of methoxypropyl acetate and heated to reflux at 47° C. under an inert atmosphere. After the reflux was established, the inert gas was turned off and a mixture of 430 g styrene, 344.2 g 2-ethylhexyl acrylate, 919.3 g of glycidyl methacrylate, 55.0 g of methoxypropyl acetate, and 172.2 g of a 50% solution of t-butylperoxyacetate in aromatic solvent was added at a constant rate over a period of 4 hours. The reflux was maintained during the addition. When all of the mixture had been added, the add lines were flushed with 54 g of methoxypropyl acetate. The reflux (now at 146° C.) was maintained for an additional hour. The acrylic product was 66.6% solids (by weight), and had a Gardner-Holt viscosity of T. The measured epoxy equivalent weight was 340 g/mole NV. The number average molecular weight was 1794, and the weight average molecular weight was 3953. The polydispersity was 2.20.

EXAMPLES 6-8

Coating Compositions

Examples 6-8 illustrate the use of the acid-functional compounds and epoxy-reactive compounds prepared in the preceding examples in clearcoat compositions.

| Ingredient | Example 6 | Example 7 | Example 8 |
|---|---|---|---|
| Example 1 acid-functional polyisocyanate | 9.73 g | 9.98 g | — |
| Example 2 acid-functional compound with cyanuric ring | — | — | 59.7 |
| Example 3 epoxy-functional polyisocyanate | 5.93 g | — | — |
| Example 4 epoxy-functional polyisocyanate | 1.60 g | — | — |
| LSE114 light stable epoxy* | — | 6.52 g | — |
| Example 5 epoxy-functional acrylic | — | — | 83.0 g |
| Propylene glycol ether | 2.74 g | 3.5 g | 20.0 g |

*Available from Monsanto

The ingredients listed were stirred together in the order given. Each of the Examples 6-8 and was then separately applied over a precoated metal substrate using a metal drawdown bar with a uniform gap height and then cured by baking the coated substrates at 250° F. for 30 minutes (in the case of Examples 6 and 7), or at 285° F. for 30 minutes (in the case of Example 8). The cured clearcoats had measured Tukon hardnesses of 12 Knoops, 4 Knoops and 16 Knoops respectively for Examples 6, 7, and 8.

The invention has been described in detail with reference to preferred embodiments thereof. It should be understood, however, that variations and modifications can be made within the spirit and scope of the invention.

We claim:

1. A coating composition comprising:
   (a) a carboxy-functional isocyanurate component according to the formula:

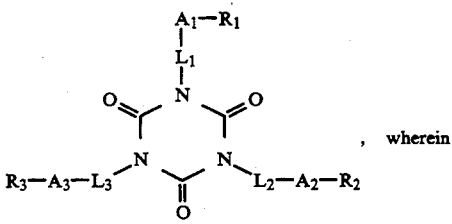

, wherein $L_1$, $L_2$, and $L_3$ each independently represents a divalent linking group, $A_1$, $A_2$, and $A_3$ each independently represents a urethane linkage or a urea linkage, and $R_1$, $R_2$, and $R_3$ each independently represents a substituent comprising a carboxyl group; and (b) a component comprising at least two groups that are reactive with said carboxyl group.

2. A coating composition according to claim 1 wherein $L_1$, $L_2$, and $L_3$ each represents a divalent aliphatic, cycloaliphatic, or aromatic linking group of 4 to 12 carbon atoms.

3. A coating composition according to claim 2 wherein $L_1$, $L_2$, and $L_3$ each represents hexamethylene.

4. A coating composition according to claim 2 wherein $L_1$, $L_2$, and $L_3$ each independently represents the residue of isophorone diisocyanate.

5. A coating composition according to claim 1 wherein $R_1$, $R_2$, and $R_3$ each independently represents alkyl carboxyl, aromatic carboxyl, or cycloaliphatic carboxyl.

6. A coating composition according to claim 1 wherein $R_1$, $R_2$, and $R_3$ each independently represents a substituent comprising a single carboxyl group.

7. A coating composition according to claim 1 wherein the component (b) is a polyepoxide or a carbodiimide.

8. A coating composition according to claim 1 wherein the component (b) is a polyepoxide.

9. A coating composition according to claim 1 wherein the component (b) is an epoxy-functional acrylic oligomer or polymer.

10. An article comprising a substrate having thereon a cured coating of the composition according to claim 1.

11. An article according to claim 10 wherein the cured coating is the clearcoat of a color-plus-clear composite coating.

12. An article according to claim 10 wherein the component (b) is an epoxy-functional acrylic oligomer or polymer.

13. An article according to claim 12 wherein the cured coating is the clearcoat of a color-plus-clear composite coating.

14. A compound according to the formula:

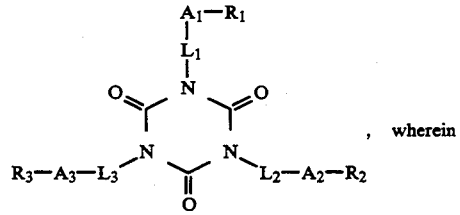

, wherein $L_1$, $L_2$, and $L_3$ each independently represents a divalent linking group, $A_1$, $A_2$, and $A_3$ each independently represents a urethane linkage or a urea linkage, and $R_1$, $R_2$, and $R_3$ each independently represents a substituent comprising a carboxyl group.

* * * * *